(12) United States Patent
Hori et al.

(10) Patent No.: US 12,705,050 B2
(45) Date of Patent: Aug. 11, 2026

(54) SYSTEMS AND IMPROVEMENT METHODS FOR INTERACTIVE RELATIONSHIP GRAPH TO ADJUST PERFORMANCE METRICS

(71) Applicant: HITACHI ASTEMO, LTD., Hitachinaka (JP)

(72) Inventors: Akihiro Hori, Tokyo (JP); Masumi Kawakami, Tokyo (JP); Tomoaki Nakamura, Hitachinaka (JP); Tomomi Okamoto, Hitachinaka (JP); Hajime Saito, Hitachinaka (JP); Takayuki Kawashima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 179 days.

(21) Appl. No.: 18/563,747

(22) PCT Filed: Feb. 9, 2022

(86) PCT No.: PCT/JP2022/005220
§ 371 (c)(1),
(2) Date: Nov. 22, 2023

(87) PCT Pub. No.: WO2022/254802
PCT Pub. Date: Dec. 8, 2022

(65) Prior Publication Data
US 2024/0241720 A1 Jul. 18, 2024

(30) Foreign Application Priority Data
May 31, 2021 (JP) ................................ 2021-091790

(51) Int. Cl.
*G06F 8/77* (2018.01)

(52) U.S. Cl.
CPC .................................... *G06F 8/77* (2013.01)

(58) Field of Classification Search
CPC ........................................................ G06F 8/77
See application file for complete search history.

(56) References Cited

U.S. PATENT DOCUMENTS 7,216,088 B1 * 5/2007 Chappel ......... G06Q 10/063118 705/7.17
10,503,791 B2 * 12/2019 Agapiev ............ G06F 16/9024
(Continued)

FOREIGN PATENT DOCUMENTS

JP 2003-114974 A 4/2003
JP 2013257821 A * 12/2013
(Continued)

OTHER PUBLICATIONS

Masuda, Ayako, Tohru Matsuodani, and Kazuhiko Tsuda. "Team activities measurement method for open source software development using the Gini coefficient." 2019 IEEE International Conference on Software Testing, Verification and Validation Workshops (ICSTW). IEEE, 2019.*
(Continued)

*Primary Examiner* — Francisco J Aponte
(74) *Attorney, Agent, or Firm* — Foley & Lardner LLP

(57) ABSTRACT

An improvement system includes: a first correlation calculation unit which reads parameter information, which is information regarding a plurality of evaluation indexes in a business process, and calculates a first correlation in which a correlation between the evaluation indexes is expressed by a correlation coefficient; a graph generation unit which creates a causal relationship graph, in which the evaluation indexes are set as nodes and the correlation between the evaluation indexes is represented by a link, on the basis of the first correlation and order information which is information regarding priorities of the plurality of evaluation indexes; an interface unit which presents the causal relationship graph to a user and receives a change to the causal
(Continued)

relationship graph by the user; and an order calculation unit which updates the order information on the basis of the change to the causal relationship graph by the user, and enables the graph generation unit to generate the causal relationship graph after the change by the user.

10 Claims, 18 Drawing Sheets

(56) References Cited

U.S. PATENT DOCUMENTS

| | | | | |
|---|---|---|---|---|
| 10,983,682 | B2 * | 4/2021 | Leonard | G06T 11/206 |
| 11,182,680 | B2 * | 11/2021 | Pourshahid | G06N 5/022 |
| 11,232,175 | B2 * | 1/2022 | Feng | G06N 5/04 |
| 11,347,755 | B2 * | 5/2022 | Yu | G06F 16/24578 |
| 11,861,508 | B2 * | 1/2024 | Liu | G06N 20/00 |
| 11,960,839 | B2 * | 4/2024 | Minami | G16H 50/70 |
| 2010/0332439 | A1 * | 12/2010 | Adachi | G06Q 30/02 706/52 |
| 2011/0246483 | A1 * | 10/2011 | Darr | H04L 67/306 707/748 |
| 2012/0317058 | A1 * | 12/2012 | Abhulimen | G06N 20/00 706/2 |
| 2017/0220937 | A1 * | 8/2017 | Wada | G06F 16/2228 |
| 2019/0102680 | A1 * | 4/2019 | Liu | G06N 20/00 |
| 2020/0193314 | A1 * | 6/2020 | Kojima | G06N 5/046 |
| 2021/0216928 | A1 * | 7/2021 | O'Toole | G06F 16/29 |
| 2022/0284340 | A1 * | 9/2022 | Choudhary | G06F 11/3438 |

FOREIGN PATENT DOCUMENTS

| | | | | |
|---|---|---|---|---|
| JP | 2017-004475 A | | 1/2017 | |
| JP | 2020-098387 A | | 6/2020 | |
| WO | WO-2020215237 A1 | * | 10/2020 | G06N 5/022 |

OTHER PUBLICATIONS

International Search Report with English Translation and Written Opinion dated May 10, 2022 in corresponding International Patent Application No. PCT/JP2022/005220 (9 pages).

* cited by examiner

| | EVALUATION INDEX A | EVALUATION INDEX B | EVALUATION INDEX C | ... |
|---|---|---|---|---|
| CASE 1 | 24 | 42 | 142 | ... |
| CASE 2 | 53 | 80 | 424 | ... |
| CASE 3 | 81 | 135 | 378 | ... |
| ... | ... | ... | ... | ... |

Figure 4:
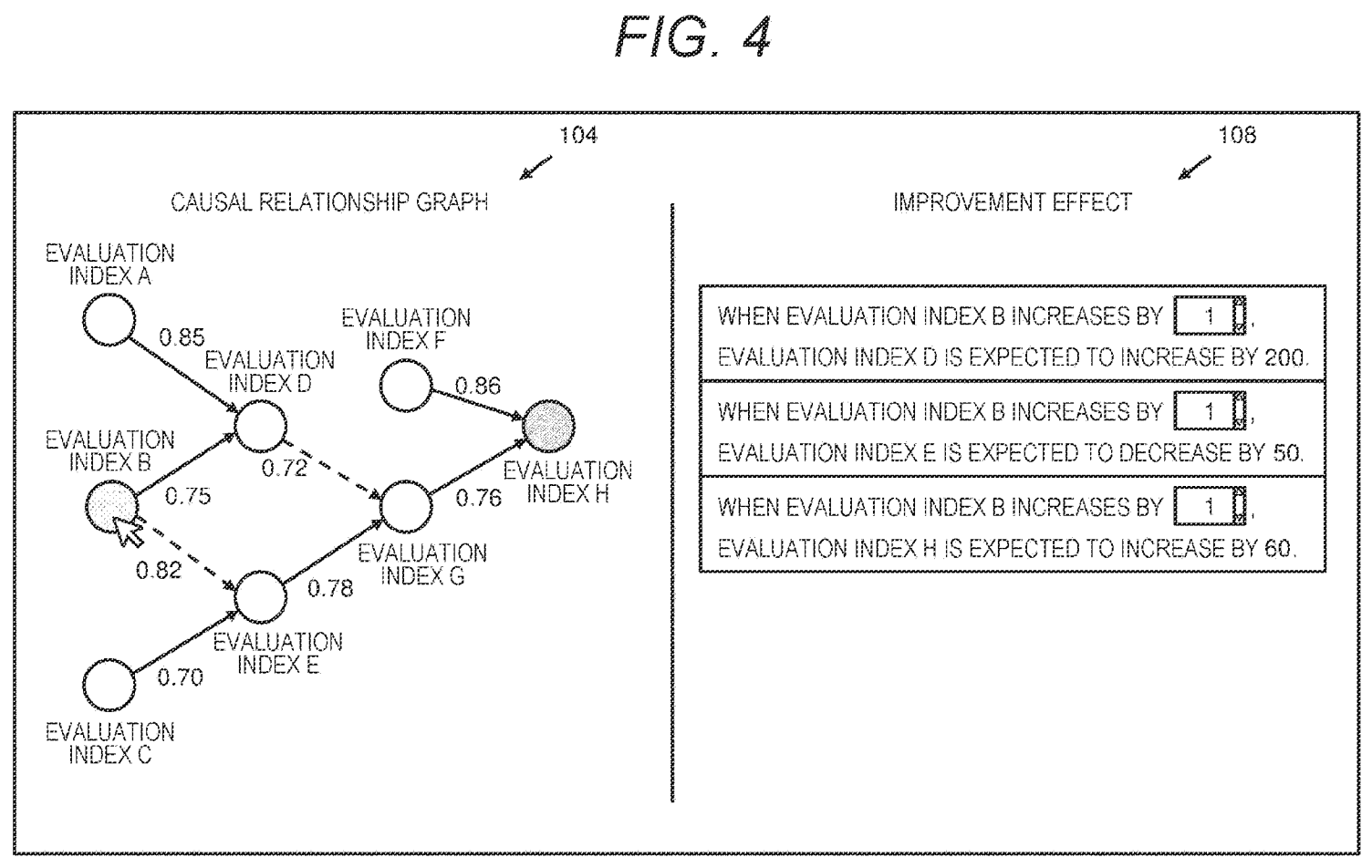

CAUSAL RELATIONSHIP GRAPH

EVALUATION INDEX A

EVALUATION INDEX B

EVALUATION INDEX C

EVALUATION INDEX D

EVALUATION INDEX E

EVALUATION INDEX F

EVALUATION INDEX G

EVALUATION INDEX H 0.85

0.75

0.82

0.70

0.72

0.78

0.86

0.76

108

IMPROVEMENT EFFECT

WHEN EVALUATION INDEX B INCREASES BY 1, EVALUATION INDEX D IS EXPECTED TO INCREASE BY 200.

WHEN EVALUATION INDEX B INCREASES BY 1, EVALUATION INDEX E IS EXPECTED TO DECREASE BY 50.

WHEN EVALUATION INDEX B INCREASES BY 1, EVALUATION INDEX H IS EXPECTED TO INCREASE BY 60.

Figure 6:
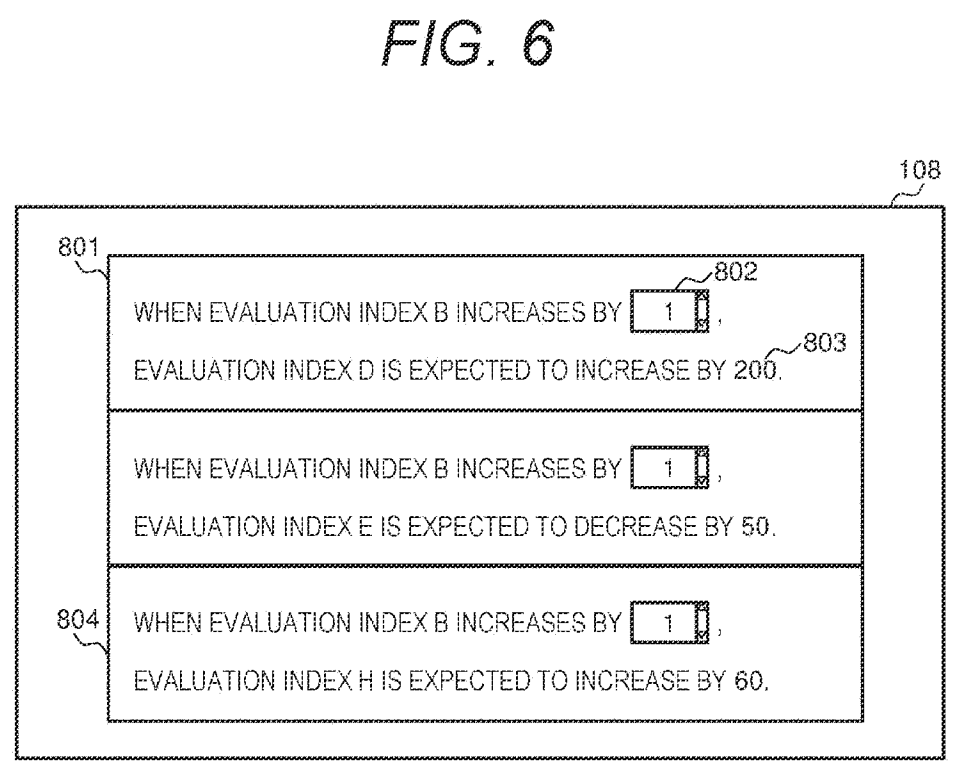

WHEN EVALUATION INDEX B INCREASES BY 1,
EVALUATION INDEX D IS EXPECTED TO INCREASE BY 200.

802

803

WHEN EVALUATION INDEX B INCREASES BY 1,
EVALUATION INDEX E IS EXPECTED TO DECREASE BY 50.

WHEN EVALUATION INDEX B INCREASES BY 1,
EVALUATION INDEX H IS EXPECTED TO INCREASE BY 60.

804

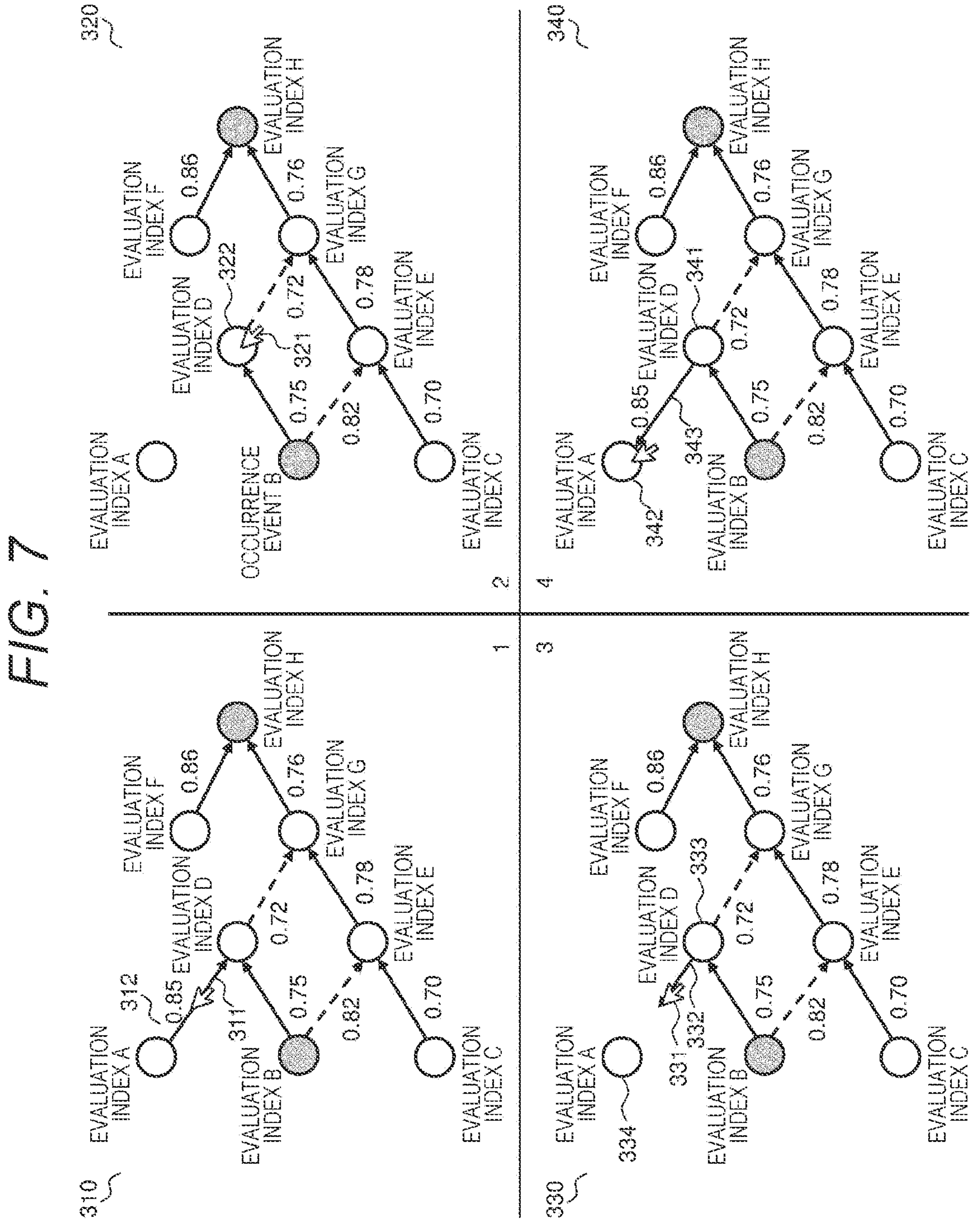
FIG. 7
310
EVALUATION INDEX A
EVALUATION INDEX B
EVALUATION INDEX C
EVALUATION INDEX D
EVALUATION INDEX E
EVALUATION INDEX F
EVALUATION INDEX G
EVALUATION INDEX H
312
311
0.85
0.75
0.82
0.70
0.72
0.78
0.86
0.76
1
320
EVALUATION INDEX A
OCCURRENCE EVENT B
EVALUATION INDEX C
EVALUATION INDEX D
EVALUATION INDEX E
EVALUATION INDEX F
EVALUATION INDEX G
EVALUATION INDEX H
322
321
0.75
0.82
0.70
0.72
0.78
0.86
0.76
2
330
EVALUATION INDEX A
334
EVALUATION INDEX B
EVALUATION INDEX C
EVALUATION INDEX D
EVALUATION INDEX E
EVALUATION INDEX F
EVALUATION INDEX G
EVALUATION INDEX H
331
332
333
0.75
0.82
0.70
0.72
0.78
0.86
0.76
3
340
EVALUATION INDEX A
342
EVALUATION INDEX B
EVALUATION INDEX C
EVALUATION INDEX D
EVALUATION INDEX E
EVALUATION INDEX F
EVALUATION INDEX G
EVALUATION INDEX H
341
343
0.85
0.75
0.82
0.70
0.72
0.78
0.86
0.76
4

| | EVALUATION INDEX A | EVALUATION INDEX B | EVALUATION INDEX C | EVALUATION INDEX D | EVALUATION INDEX E | EVALUATION INDEX F | EVALUATION INDEX G | EVALUATION INDEX H |
|---|---|---|---|---|---|---|---|---|
| EVALUATION INDEX A | | 0.23 | 0.14 | 0.85 | -0.32 | -0.23 | -0.49 | -0.46 |
| EVALUATION INDEX B | 0.23 | | -0.21 | 0.75 | -0.82 | -0.24 | -0.17 | -0.39 |
| EVALUATION INDEX C | 0.14 | -0.21 | | -0.38 | 0.70 | 0.46 | 0.58 | 0.42 |
| EVALUATION INDEX D | 0.85 | 0.75 | -0.38 | | -0.29 | -0.21 | -0.72 | -0.66 |
| EVALUATION INDEX E | -0.32 | -0.82 | 0.70 | -0.29 | | 0.38 | 0.78 | 0.53 |
| EVALUATION INDEX F | -0.23 | -0.24 | 0.46 | -0.21 | 0.38 | | 0.29 | 0.86 |
| EVALUATION INDEX G | -0.49 | -0.17 | 0.58 | -0.72 | 0.78 | 0.29 | | 0.76 |
| EVALUATION INDEX H | -0.46 | -0.39 | 0.42 | -0.66 | 0.53 | 0.86 | 0.76 | |

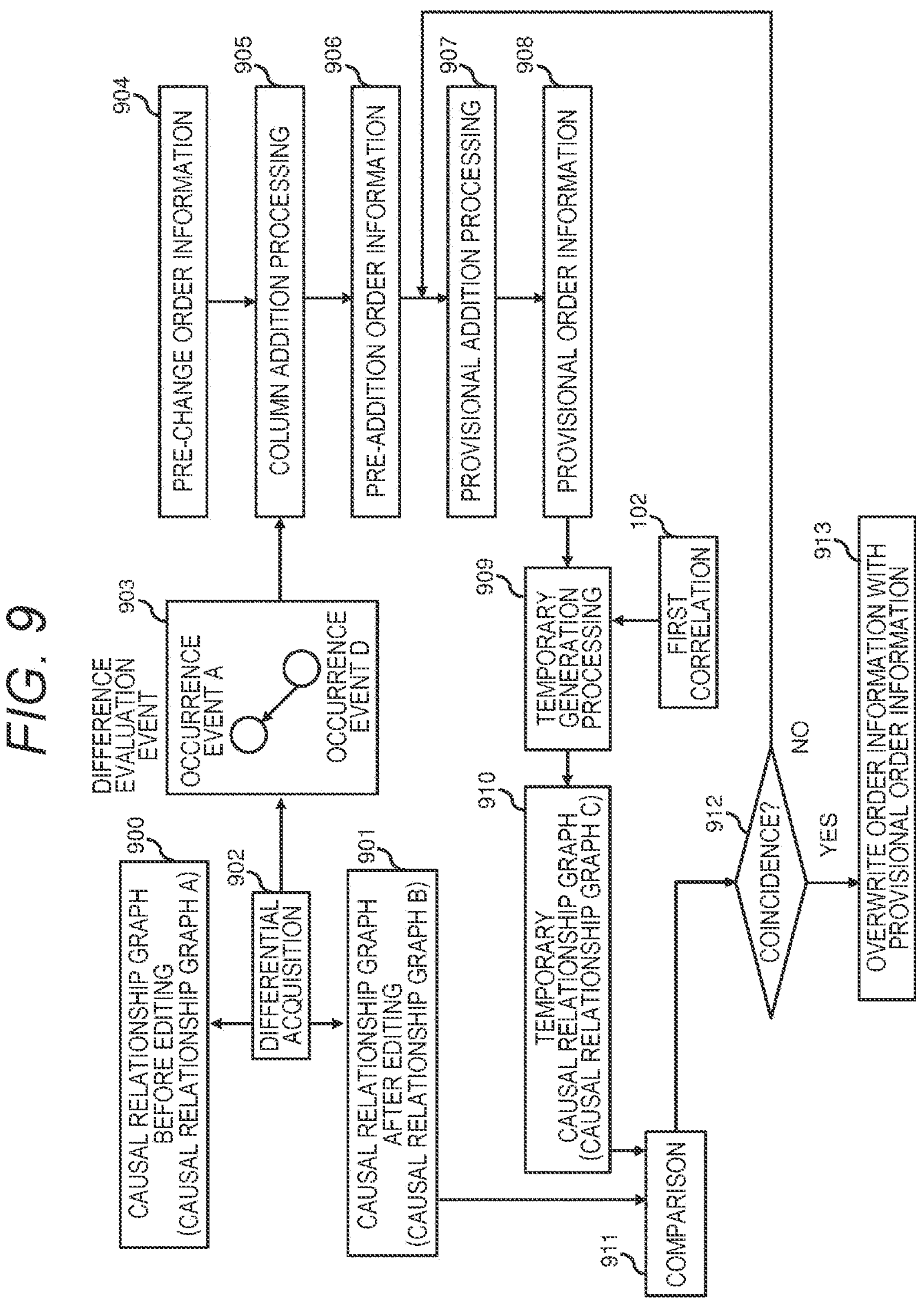
FIG. 9
CAUSAL RELATIONSHIP GRAPH BEFORE EDITING (CAUSAL RELATIONSHIP GRAPH A)
900
DIFFERENTIAL ACQUISITION
902
CAUSAL RELATIONSHIP GRAPH AFTER EDITING (CAUSAL RELATIONSHIP GRAPH B)
901
DIFFERENCE EVALUATION EVENT
903
OCCURRENCE EVENT A
OCCURRENCE EVENT D
PRE-CHANGE ORDER INFORMATION
904
COLUMN ADDITION PROCESSING
905
PRE-ADDITION ORDER INFORMATION
906
PROVISIONAL ADDITION PROCESSING
907
PROVISIONAL ORDER INFORMATION
908
TEMPORARY GENERATION PROCESSING
909
FIRST CORRELATION
102
TEMPORARY CAUSAL RELATIONSHIP GRAPH (CAUSAL RELATIONSHIP GRAPH C)
910
COMPARISON
911
COINCIDENCE?
912
YES
NO
OVERWRITE ORDER INFORMATION WITH PROVISIONAL ORDER INFORMATION
913

Figure 10:
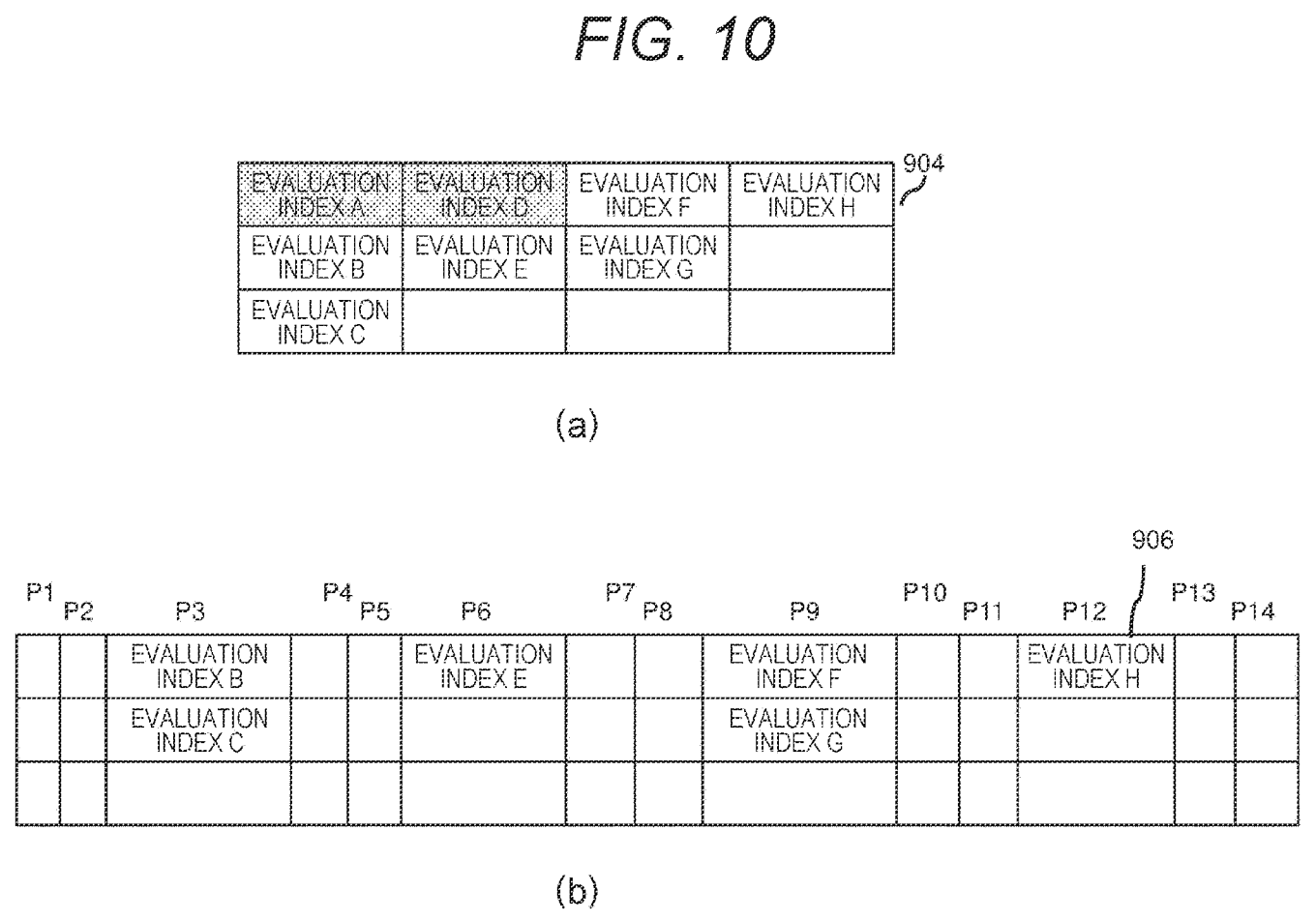

| | | | |
|---|---|---|---|
| EVALUATION INDEX A | EVALUATION INDEX D | EVALUATION INDEX F | EVALUATION INDEX H |
| EVALUATION INDEX B | EVALUATION INDEX E | EVALUATION INDEX G | |
| EVALUATION INDEX C | | | |

(a)

906

| P1 | P2 | P3 | P4 | P5 | P6 | P7 | P8 | P9 | P10 | P11 | P12 | P13 | P14 |
|---|---|---|---|---|---|---|---|---|---|---|---|---|---|
| | | EVALUATION INDEX B | | | EVALUATION INDEX E | | | EVALUATION INDEX F | | | EVALUATION INDEX H | | |
| | | EVALUATION INDEX C | | | | | | EVALUATION INDEX G | | | | | |
| | | | | | | | | | | | | | |

(b)

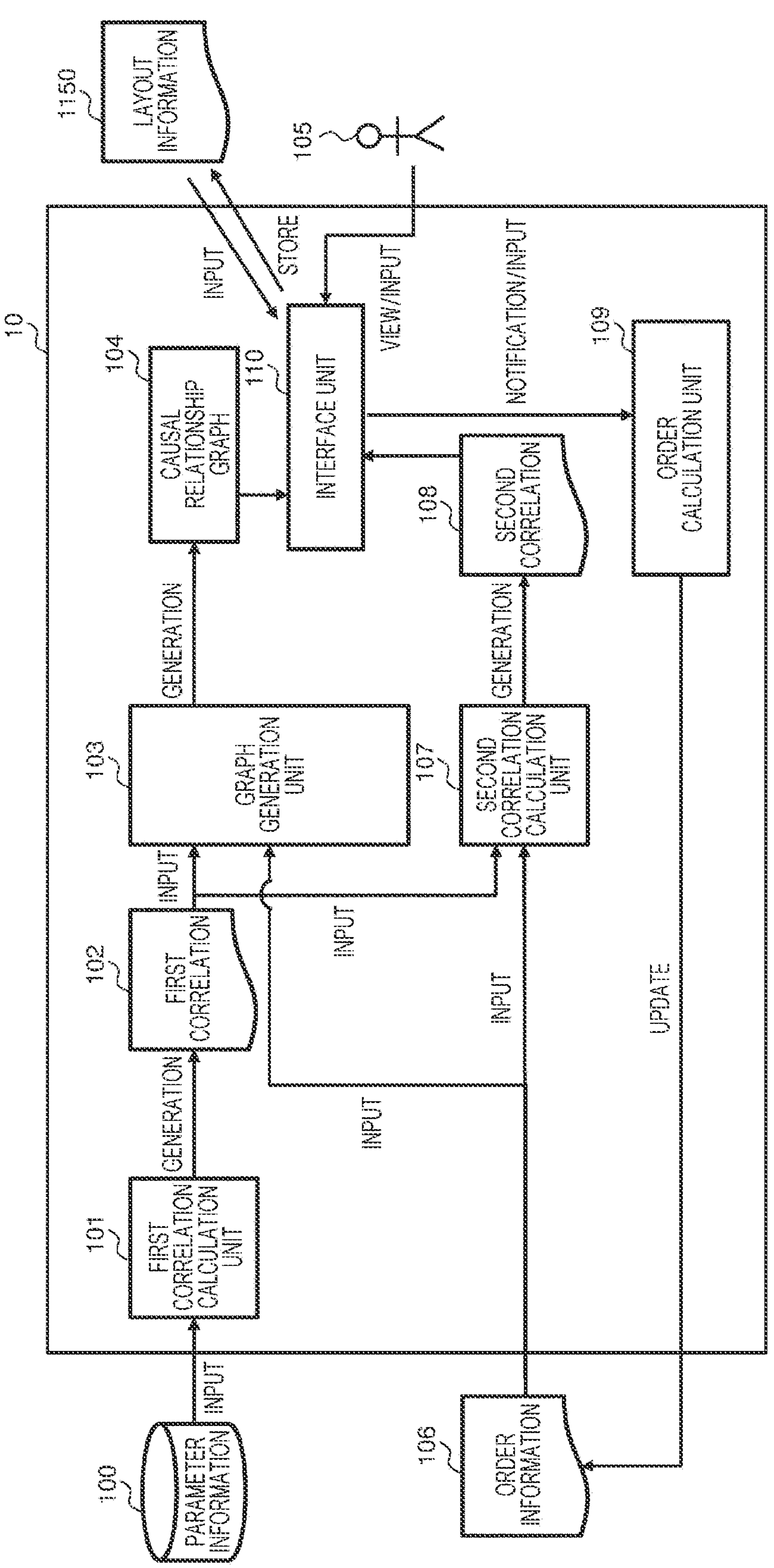
FIG. 14
10
100
PARAMETER INFORMATION
INPUT
101
FIRST CORRELATION CALCULATION UNIT
GENERATION
102
FIRST CORRELATION
INPUT
103
GRAPH GENERATION UNIT
GENERATION
104
CAUSAL RELATIONSHIP GRAPH
110
INTERFACE UNIT
INPUT
STORE
1150
LAYOUT INFORMATION
105
VIEW/INPUT
NOTIFICATION/INPUT
109
ORDER CALCULATION UNIT
108
SECOND CORRELATION
GENERATION
107
SECOND CORRELATION CALCULATION UNIT
INPUT
INPUT
INPUT
UPDATE
106
ORDER INFORMATION

| | X | Y |
|---|---|---|
| EVALUATION INDEX A | 21 | 43 |
| EVALUATION INDEX B | 16 | 29 |
| ... | ... | ... |

SYSTEMS AND IMPROVEMENT METHODS FOR INTERACTIVE RELATIONSHIP GRAPH TO ADJUST PERFORMANCE METRICS

TECHNICAL FIELD

The present invention relates to an improvement system and an improvement method.

BACKGROUND ART

In a software development project, improvement measures may be planned on the basis of data obtained from the project. In order to efficiently plan the measures, a causal relationship graph is used in which a project occurrence event is set as a node, and a cause node is connected to a result node by a directed edge. The causal relationship graph represents a relationship such as "when one event occurs, another event is likely to occur" with a node and a directed edge. For example, the planner of measures can find measures to be taken by tracing in a reverse direction the directed edge leading to an important occurrence event such as "profit improvement of the project". In PTL 1, a causal relationship display system is disclosed which includes: a graph generation unit which generates, on the basis of causal relationship information that is information indicating causal relationships between a plurality of elements, each element being a cause or a result, a directed graph including a plurality of nodes respectively corresponding to the plurality of elements and a plurality of edges corresponding to the causal relationships between the plurality of elements; and a user interface (UI) control unit which displays output information including the generated directed graph. In the directed graph, a first direction being a horizontal direction or a vertical direction is an x direction having a +x direction and a −x direction, a second direction perpendicular to the first direction is a y direction having a +y direction and a −y direction, and line segments of two or more edges respectively coupled from one or more nodes to one or more different nodes are allowed to partly overlap with each other.

CITATION LIST

Patent Literature

PTL 1: JP 2020-098387 A

SUMMARY OF INVENTION

Technical Problem

In the invention described in PTL 1, editing to the causal relationship graph cannot be reflected in order information.

Solution to Problem

An improvement system according to a first aspect of the present invention includes: a first correlation calculation unit which reads parameter information, which is information regarding a plurality of evaluation indexes in a business process, and calculates a first correlation in which a correlation between the evaluation indexes is expressed by a correlation coefficient; a graph generation unit which creates a causal relationship graph, in which the evaluation indexes are set as nodes and a correlation between the evaluation indexes is represented by a link, on the basis of the first correlation and order information which is information regarding priorities of the plurality of evaluation indexes; an interface unit which presents the causal relationship graph to a user and receives a change to the causal relationship graph by the user; and an order calculation unit which updates the order information on the basis of the change to the causal relationship graph by the user, and enables the graph generation unit to generate the causal relationship graph after the change by the user.

An improvement method according to a second aspect of the present invention is an improvement method executed by one or more computers, the improvement method including: a first correlation calculation step of reading parameter information, which is information regarding a plurality of evaluation indexes in a business process, and calculating a first correlation in which a correlation between the evaluation indexes is expressed by a correlation coefficient; a graph generation step of creating a causal relationship graph, in which the evaluation indexes are set as nodes and a correlation between the evaluation indexes is represented by a link, on the basis of the first correlation and order information which is information regarding priorities of the plurality of evaluation indexes; an input step of presenting the causal relationship graph to a user and receiving a change to the causal relationship graph by the user; and an order calculation step of updating the order information on the basis of the change to the causal relationship graph by the user, and enabling the graph generation step to generate the causal relationship graph after the change by the user.

Advantageous Effects of Invention

According to the present invention, editing to the causal relationship graph can be reflected in the order information.

BRIEF DESCRIPTION OF DRAWINGS

FIG. 2 is a diagram illustrating an example of parameter information.

FIG. 4 is a diagram illustrating an example of display of an interface unit in the first embodiment.

FIG. 6 is a diagram illustrating an example of a second correlation.

FIG. 7 is a diagram illustrating an operation of the causal relationship graph by a user.

FIG. 8 is a diagram illustrating an example of a first correlation.

FIG. 9 is a diagram visually illustrating processing of an order calculation unit.

FIG. 10 is a diagram visually illustrating the processing of the order calculation unit.

FIG. 14 is a functional configuration diagram of the improvement system according to the second embodiment.

DESCRIPTION OF EMBODIMENTS

First Embodiment

Hereinafter, a first embodiment of an improvement system will be described with reference to FIGS. 1 to 13.

Figure 1:
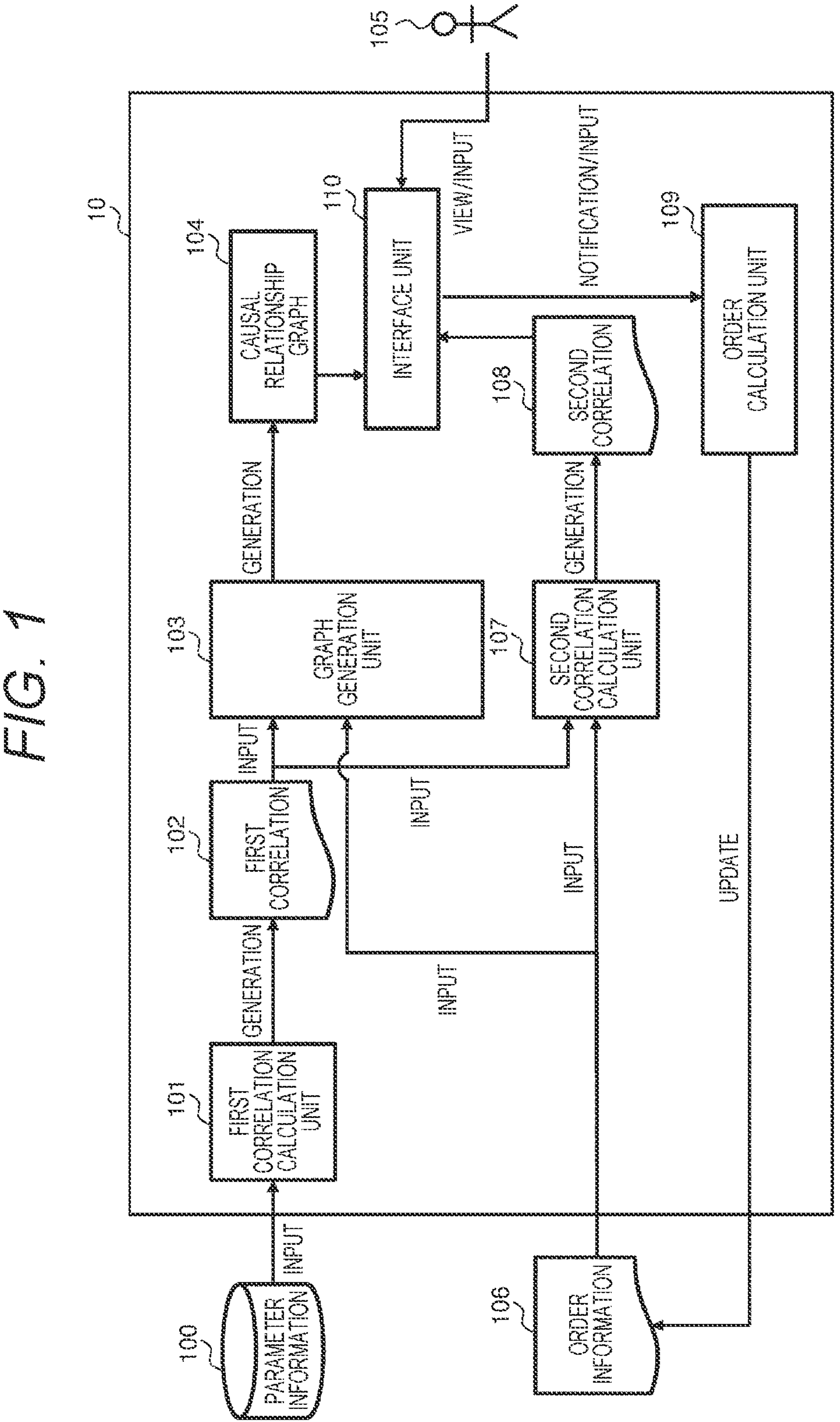
FIG. 1 is a functional configuration diagram of an improvement system according to a first embodiment.

FIG. 1 is a functional configuration diagram of an improvement system 10. The improvement system 10 includes a first correlation calculation unit 101, a second correlation calculation unit 107, a graph generation unit 103, an order calculation unit 109, and an interface unit 110. The improvement system 10 includes one or more arithmetic devices. This arithmetic device includes, for example, a CPU which is a central arithmetic device, a ROM which is a read-only storage device, and a RAM which is a readable/writable storage device, and the CPU performs various arithmetic operations by developing a program stored in the ROM in the RAM and executing the program. The arithmetic device may be realized by a field programmable gate array (FPGA), which is a rewritable logic circuit, or an application specific integrated circuit (ASIC), which is an application specific integrated circuit, instead of a combination of the CPU, the ROM, and the RAM. In addition, the arithmetic device may be realized by a combination of different configurations, for example, a combination of the CPU, the ROM, the RAM, and the FPGA, instead of the combination of the CPU, the ROM, and the RAM.

The first correlation calculation unit 101, the second correlation calculation unit 107, the graph generation unit 103, and the order calculation unit 109 are realized by, for example, the above-described combination of the CPU, ROM, and RAM. The interface unit 110 is realized by, for example, a combination of a liquid crystal display and a pointing device, or a liquid crystal display.

The improvement system 10 reads parameter information 100 and order information 106 and starts an operation. The parameter information 100 includes a plurality of types of parameters, specifically, values of respective evaluation indexes which are key performance indicators (KPI). The order information 106 is information on the priorities of all the parameters included in the parameter information 100.

The first correlation calculation unit 101 reads the parameter information 100 and generates a first correlation 102. The graph generation reads the first correlation 102 and the order information 106, and generates a causal relationship graph 104. The second correlation calculation unit 107 reads the first correlation 102 and the order information 106, and generates a second correlation 108. Hereinafter, the second correlation 108 is also referred to as an “improvement effect” 108. A user 105 who uses the improvement system 10 can view and edit the causal relationship graph 104 and view the second correlation 108 via the interface unit 110. When the user 105 edits the causal relationship graph 104, the order calculation unit 109 which has received notification thereof updates the order information 106. When the order information 106 is updated, the second correlation calculation unit 107 reads the first correlation 102 and the order information 106 again, and generates the second correlation 108 again.

FIG. 2 is a diagram illustrating an example of the parameter information 100. The parameter information 100 includes a value of each evaluation index for each viewpoint. The viewpoint is a common attribute for grouping events, and is, for example, a case, a product, a manufacturing place of the product, a manufacturer, or the like. The evaluation index is, for example, a manufacturing process, a due date, man-hours, cost, a delay in due date, or the like. In the example illustrated in FIG. 4, the viewpoint is described as “case”. That is, the parameter information 100 illustrated in FIG. 2 includes a value of the evaluation index such as an evaluation index A, an evaluation index B, and an evaluation index C for each of the cases such as a case 1, a case 2, and a case 3.

Figure 3:
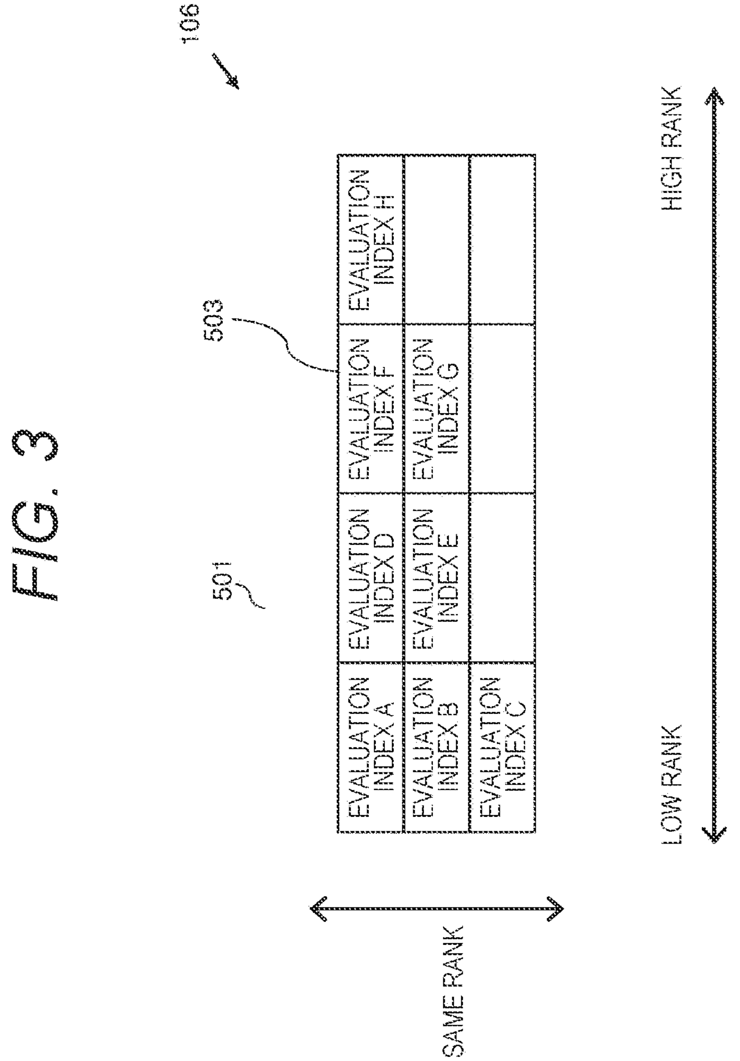
FIG. 3 is a diagram visually illustrating an example of order information.

FIG. 3 is a diagram visually illustrating an example of the order information 106. The order information 106 includes information regarding the order of the evaluation indexes included in the parameter information 100. Note that the order information 106 can also be said to indicate the priority of the evaluation index, and, in a case where the evaluation index is a business process, is also the execution order of the business process. The ranks of the evaluation indexes can be represented by various methods, but are visually illustrated in FIG. 3 for description. In the example illustrated in FIG. 3, the rank is lower toward the left side in the drawing and higher toward the right side in the drawing. In addition, in FIG. 3, a vertical direction in the drawing indicates the same order. For example, FIG. 3 illustrates that an evaluation index D has a higher rank than an evaluation index A, and the evaluation index A and an evaluation index B have the same rank.

FIG. 4 is a diagram illustrating display of the interface unit 110, specifically, the causal relationship graph 104 and the second correlation 108. In FIG. 4, the causal relationship graph 104 is displayed in the left half of the interface unit 110, and the second correlation 108 is displayed in the right half. The user 105 can operate the causal relationship graph 104 and the second correlation 108 displayed on the interface unit 110. The operation will be described later. Each of the causal relationship graph 104 and the second correlation 108 will be described with reference to other drawings.

Figure 5:
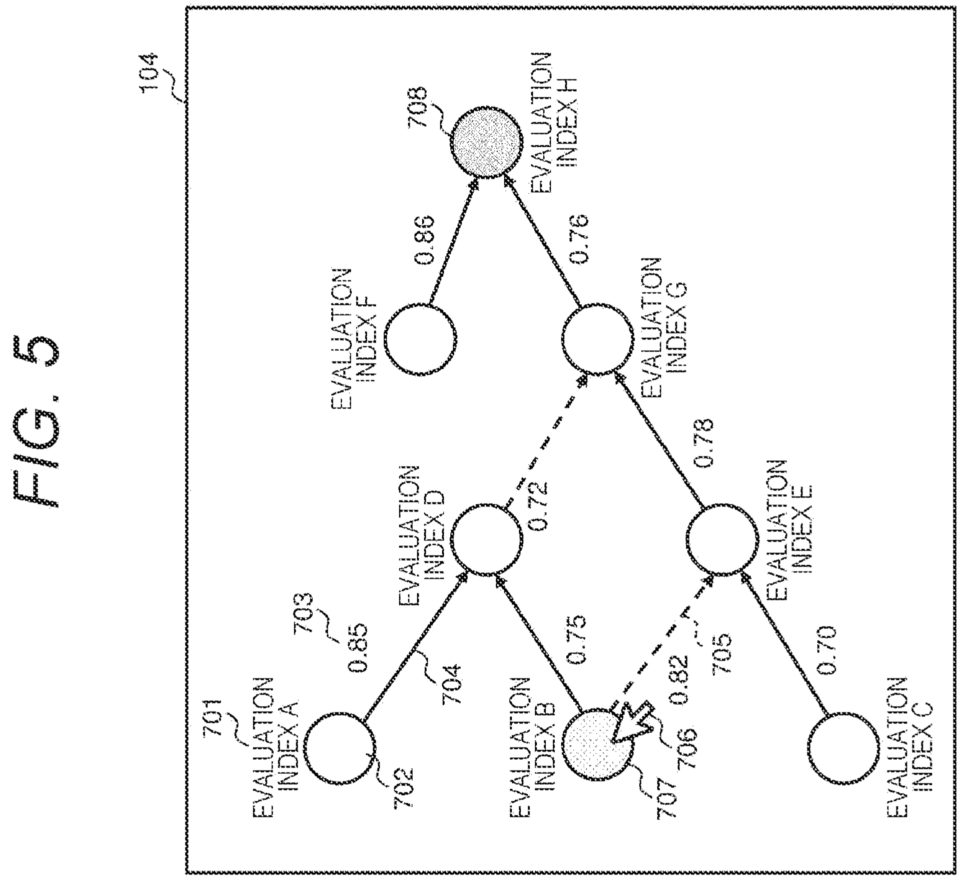
FIG. 5 is a diagram illustrating an example of a causal relationship graph.

FIG. 5 is a diagram illustrating an example of the causal relationship graph 104. The causal relationship graph 104 includes a plurality of points 702 representing evaluation indexes and a plurality of directed edges 704 between the evaluation indexes. In the causal relationship graph 104, it can be said that the evaluation indexes are set as nodes, and a link connecting the nodes indicates a correlation between the evaluation indexes. In the causal relationship graph 104, nodes, that is, evaluation indexes having a strong dissimilarity relationship are connected by a link, that is, a directed edge 704. A label 701 representing the name of an evaluation index is displayed near the point 702 representing the evaluation index. An absolute value 703 of a correlation coefficient between evaluation indexes is displayed near the directed edge 704 connecting the evaluation indexes. Note that in a case where the correlation coefficient is a negative number, the directed edge 704 between the evaluation indexes is displayed as a broken line as indicated by reference sign 705. In the example illustrated in FIG. 5, only nodes in which the absolute value of the correlation coefficient is 0.70 or more, which is a threshold defined inside the system, are illustrated.

For example, arrows extend from the evaluation index A and the evaluation index B toward the evaluation index D, and broken arrows extend from the evaluation index D to the evaluation index G. This indicates that the value of the evaluation index D increases as the value of the evaluation index A or the evaluation index B increases, and the value of the evaluation index G decreases as the value of the evaluation index D further increases.

When the user 105 clicks a point representing the evaluation index with a mouse pointer 706 with the causal relationship graph 104 displayed on the interface unit 110 as an operation target, the interface unit 110 changes the color as indicated by reference sign 707 to indicate that the point has been selected. In addition, the important evaluation index defined inside the system may be always displayed in a color that can be distinguished from other points as indicated by reference sign 708.

FIG. 6 is a diagram illustrating an example of the second correlation 108. The second correlation 108 includes one or more individual improvement effects 801. The individual improvement effect 801 includes a sentence such as "when "E1" increases by "N1", "E2" is expected to increase (decrease) by "N2".". "E1" and "E2" in this sentence are names of evaluation indexes, and "N1" and "N2" are numerical values. At this time, the part of "when "E1" increases by "N1"" is referred to as an improvement measure phrase, and the part "when "E2" increases (decreases) by "N2"" is referred to as an improvement effect phrase.

When the user 105 clicks the point 707 representing any evaluation index by using the mouse pointer 706 in the causal relationship graph 104 displayed on the interface unit 110, the interface unit 110 performs the following processing. That is, the interface unit 110 displays, on the interface unit 110, the individual improvement effect 801 in which the point clicked by the user 105 is set as an improvement measure phrase and the end point connected by the directed edge from the clicked point is set as an improvement effect phrase. Furthermore, the interface unit 110 also displays an individual improvement effect 804 in which the clicked point is set as an improvement measure phrase and the important evaluation index defined inside the system as indicated by reference sign 708 is set as an improvement effect phrase.

The interface unit 110 may further receive editing of the numerical value of a measure numerical value 802 in the individual improvement effect 801 by the user 105. The interface unit 110 immediately updates an improvement effect numerical value 803 in response to the editing of the measure numerical value 802 by the user. For example, when the measure numerical value 802 is set to twice the current value, the interface unit 110 sets the improvement effect numerical value 803 to twice the current value. That is, the interface unit 110 multiplies the quantity in the improvement effect 801 by a predetermined magnification according to the operation of the user 105 and displays the result.

FIG. 7 is a diagram illustrating an operation of the causal relationship graph 104 by the user 105. FIG. 7 is roughly divided into four, and the state starts from the first FIG. 310 of the upper left side, passes through the second FIG. 320 of the upper right side and the third FIG. 330 of the lower left side, and becomes the fourth FIG. 340 of the lower right side. On the basis of the operation of the user 105, the interface unit 110 rewrites the causal relationship graph 104 displayed as follows. Hereinafter, an example of deletion and addition of a directed edge will be described.

The user 105 moves a mouse pointer 311 on the interface unit 110 on which the first FIG. 310 is displayed and clicks a directed edge 312 to be deleted. Then, as illustrated in the second FIG. 320, the interface unit 110 erases the clicked directed edge 312. Next, when the user 105 clicks a start point 322 of the directed edge to be added with a mouse pointer 321 and moves a mouse pointer 331 toward an end point 334 of the directed edge to be added, the interface unit 110 performs the following processing.

That is, while the user 105 is moving the mouse pointer 321, the interface unit 110 displays a directed edge 332 from a start point 333 toward the mouse pointer 331 as illustrated in the third FIG. 330. When the mouse pointer 331 reaches an end point 334, the interface unit 110 additionally displays a directed edge 343 from a start point 341 to an end point 342 as illustrated in the fourth FIG. 340.

FIG. 8 is a diagram illustrating an example of the first correlation 102. The first correlation 102 indicates a correlation between the evaluation indexes. In a column 601 and a row 602, respective evaluation indexes are described. In a cell 603, a correlation coefficient between the evaluation index of the column and the evaluation index of the row is described. Note that when the evaluation index of the column and the evaluation index of the row indicate the same evaluation index as in a cell 604, no value is input. The first correlation calculation unit 101 reads the parameter information 100, calculates correlation coefficients between pairs of evaluation indexes in all cases, and outputs the correlation coefficients as the first correlation 102. Note that this correlation is calculated by linear approximation assuming that the correlation has a linear characteristic.

The operation of the graph generation unit 103 will be described. The graph generation unit 103 first reads the first correlation 102 and the order information 106. Next, for a cell having an absolute value exceeding the threshold defined inside the system among the values of the cells of the first correlation 102, the graph generation unit 103 extracts, as a pair, the evaluation index of the column and the evaluation index of the row of the cell. Then, the graph generation unit 103 reads the rank of each evaluation index of the pair from the order information 106. Further, the graph generation unit 103 generates a directed edge from the evaluation index with a low rank toward the evaluation index with a high rank, and describes the absolute value of the correlation coefficient in the vicinity of the directed edge. However, in a case where the correlation coefficient of the pair is a positive value, the directed edge is set as a solid directed edge, and in a where the correlation coefficient of the pair is a negative value, the directed edge is set as a broken directed edge. In this manner, the causal relationship graph 104 is generated and displayed on the interface unit 110 of the improvement system 10.

The operation of the second correlation calculation unit 107 will be described. The second correlation calculation unit 107 first reads the first correlation 102 and the order information 106. Next, for a cell having an absolute value exceeding the threshold among the values of the cells of the first correlation 102, the second correlation calculation unit 107 extracts, as a pair, the evaluation index of the column and the evaluation index of the row of the cell. Then, the second correlation calculation unit 107 reads the order of the evaluation indexes of the pair from the order information 106. Further, with an evaluation index with a low rank as an explanatory variable and a high evaluation index as an objective variable, the second correlation calculation unit 107 calculates a linear expression for predicting the objective variable from the explanatory variable by a single regression analysis. Finally, the second correlation calculation unit 107 converts a linear expression into a sentence surface such as "when "E1" increases by "N1", "E2" is expected to increase (decrease) by "N2".".

At this time, "E1" includes the name of the evaluation index with a low rank, and "E2" includes the name of the evaluation index with a high rank. "N1" includes 1 as an initial value. "N2" includes an absolute value of the slope of the linear expression. In a case where the slope of the linear expression is a positive value, "increase" is set, and in a case where the slope of the linear expression is a negative value, "decrease" is set. The second correlation calculation unit 107 performs this processing for evaluation index pairs of all cells having an absolute value exceeding the threshold described above, and stores the result as the second correlation 108.

(Processing of Order Calculation Unit 109)

Figure 11:
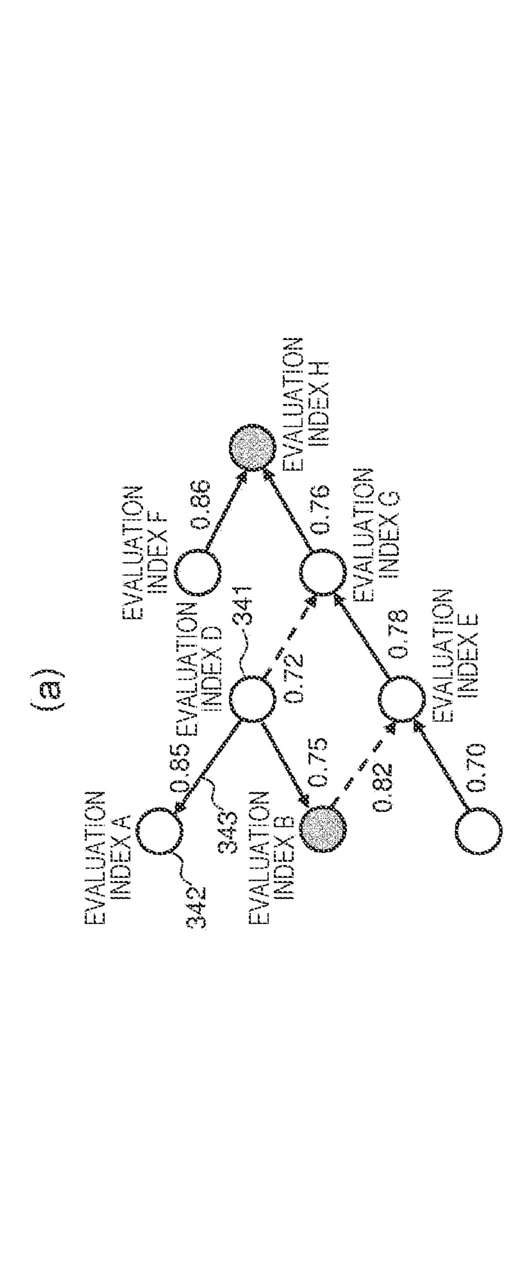
FIG. 11 is a diagram visually illustrating the processing of the order calculation unit.

FIGS. 9 to 11 are diagrams visually illustrating the processing of the order calculation unit 109. When the user 105 changes the causal relationship graph 104 by using the interface unit 110, the order calculation unit 109 corrects the order information 106 as follows. The order calculation unit 109 stores the causal relationship graph 104 (hereinafter, referred to as a "causal relationship graph A" 900) before editing by the user 105 in advance. When the user 105 edits the causal relationship graph 104, the order calculation unit 109 receives a notification of a change from the interface unit 110 and reads the edited causal relationship graph 104 (hereinafter, referred to as a "causal relationship graph B" 901).

Then, the order calculation unit 109 performs difference acquisition processing 902 of the causal relationship graph A 900 and the causal relationship graph B 901, and extracts a difference evaluation index 903 which is a difference between both. At this time, in a case where the causal relationship graph A 900 is the first FIG. 310 of FIG. 7 and the causal relationship graph B 901 is the fourth FIG. 340 of FIG. 7, the difference evaluation index 903 is as illustrated in FIG. 9.

Next, the order calculation unit 109 reads the order information 106 before the change (hereinafter, referred to as "pre-change order information" 904). Then, the order calculation unit 109 performs column addition processing 905 of deleting all the evaluation indexes included in the difference evaluation index 903 from the pre-change order information 904 and adding columns as many as the number of the difference evaluation index 903 to each column in which the evaluation index exists, thereby generating pre-addition order information 906. For example, in a case where the user 105 changes the directed graph from the evaluation index A to the evaluation index D in a reverse direction as in the example of FIG. 4, the evaluation index A and the evaluation index D are deleted from the pre-change order information 904 as illustrated in FIG. 10(*a*), and two columns are added to each column in which the evaluation index exists to obtain the state illustrated in FIG. 10(*b*). Note that P1 to P14 in FIG. 10(*b*) are described for later description.

Next, the order calculation unit 109 performs provisional addition processing 907 of adding the difference evaluation index 903 to the pre-addition order information 906 to obtain provisional order information 908. In the provisional addition processing 907, it is essential to reflect the order indicated by the difference evaluation index 903, that is, that the order of the evaluation index A is higher than that of the evaluation index D, but since the relationship of the rank with other evaluation indexes is not found immediately, one of the assumed orders is selected. The provisional addition processing 907 for generating the provisional order information 908 will be specifically described with reference to FIGS. 10 and 11.

In a case where the evaluation index A and the evaluation index D are added to the pre-addition order information 906 illustrated in FIG. 10(*b*), since the order of the evaluation index A is higher than that of the evaluation index D as described above, the evaluation index A is arranged at a position on the right side in the drawing with respect to the evaluation index D. With respect to P1 to P14 in which the evaluation index A and the evaluation index D can be arranged, a constraint condition is only the relative position of both, and thus the number of combinations that can be arranged is enormous.

For example, the evaluation index D can be arranged in a position other than the rightmost P14 among P1 to P14, and in a case where the evaluation index D is arranged in P6, the evaluation index A can be arranged in any of P7 to P14. The order calculation unit 109 selects any one combination from the enormous combinations, arranges the evaluation indexes A and D, and generates the provisional order information 908. The provisional order information 908 illustrated in FIG. 11(*a*) illustrates an example in which the evaluation index D is arranged in P2 of the pre-addition order information 906 and the evaluation index A is arranged in P12 of the pre-addition order information 906. Returning to FIG. 9, the description will be continued.

Next, the order calculation unit 109 creates a temporary causal relationship graph 104 (hereinafter, referred to as a "causal relationship graph C" 910) by using the provisional order information 908 created immediately before and the first correlation 102. Note that the order calculation unit 109 may cause the graph generation unit 103 to generate the causal relationship graph C 910. Then, the order calculation unit 109 executes comparison processing 911 between the causal relationship graph B 901 and the causal relationship graph C 910 edited by the user. Then, the order calculation unit 109 performs coincidence determination 912 for determining the result of the comparison processing 911, and in a case where it is determined that both do not coincide with each other, the process returns to the provisional addition processing 907 to select another combination. When determining that both coincide with each other, the order calculation unit 109 performs update processing 913 of overwriting the order information 106 with the latest provisional order information 908. The above is the description of FIG. 9.

(Flowchart)

Figure 12:
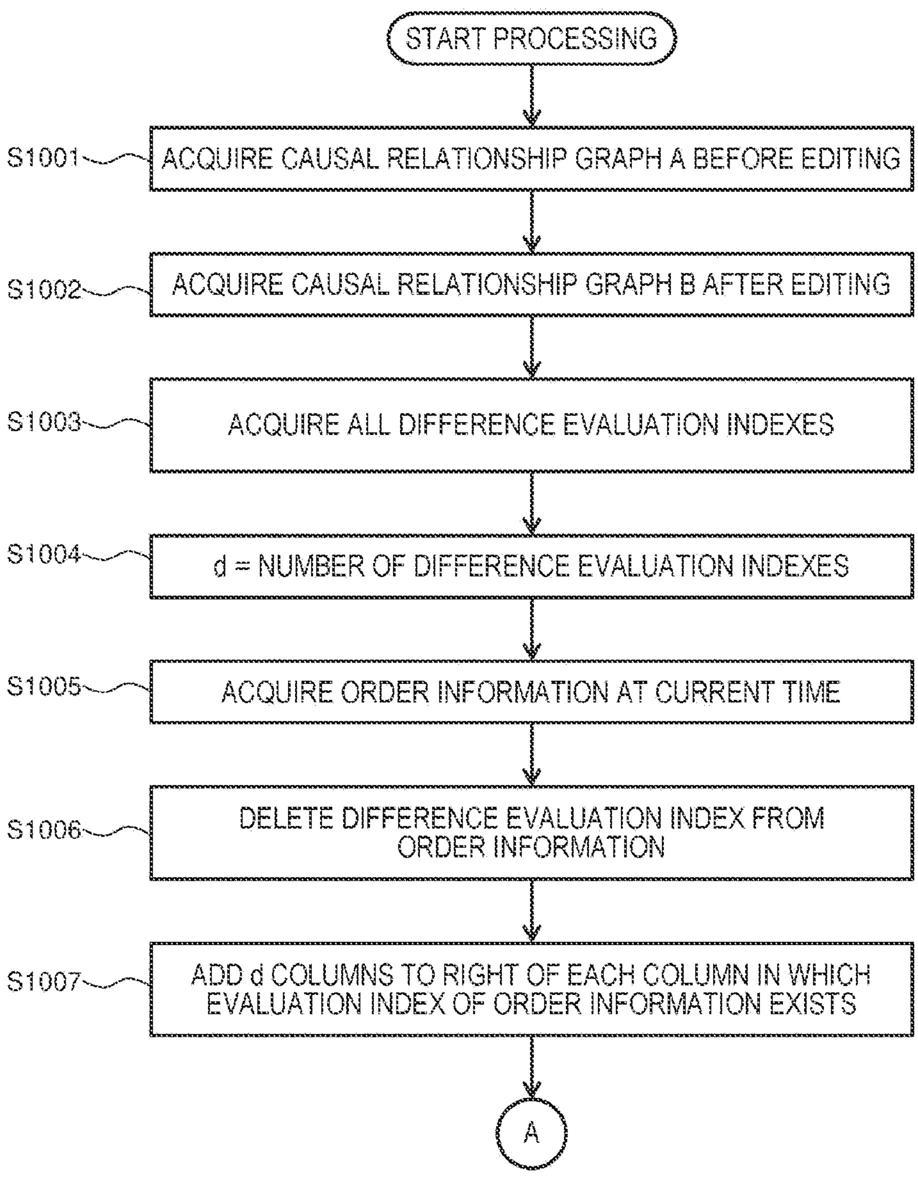
FIG. 12 is a flowchart illustrating the processing of the order calculation unit.
Figure 13:
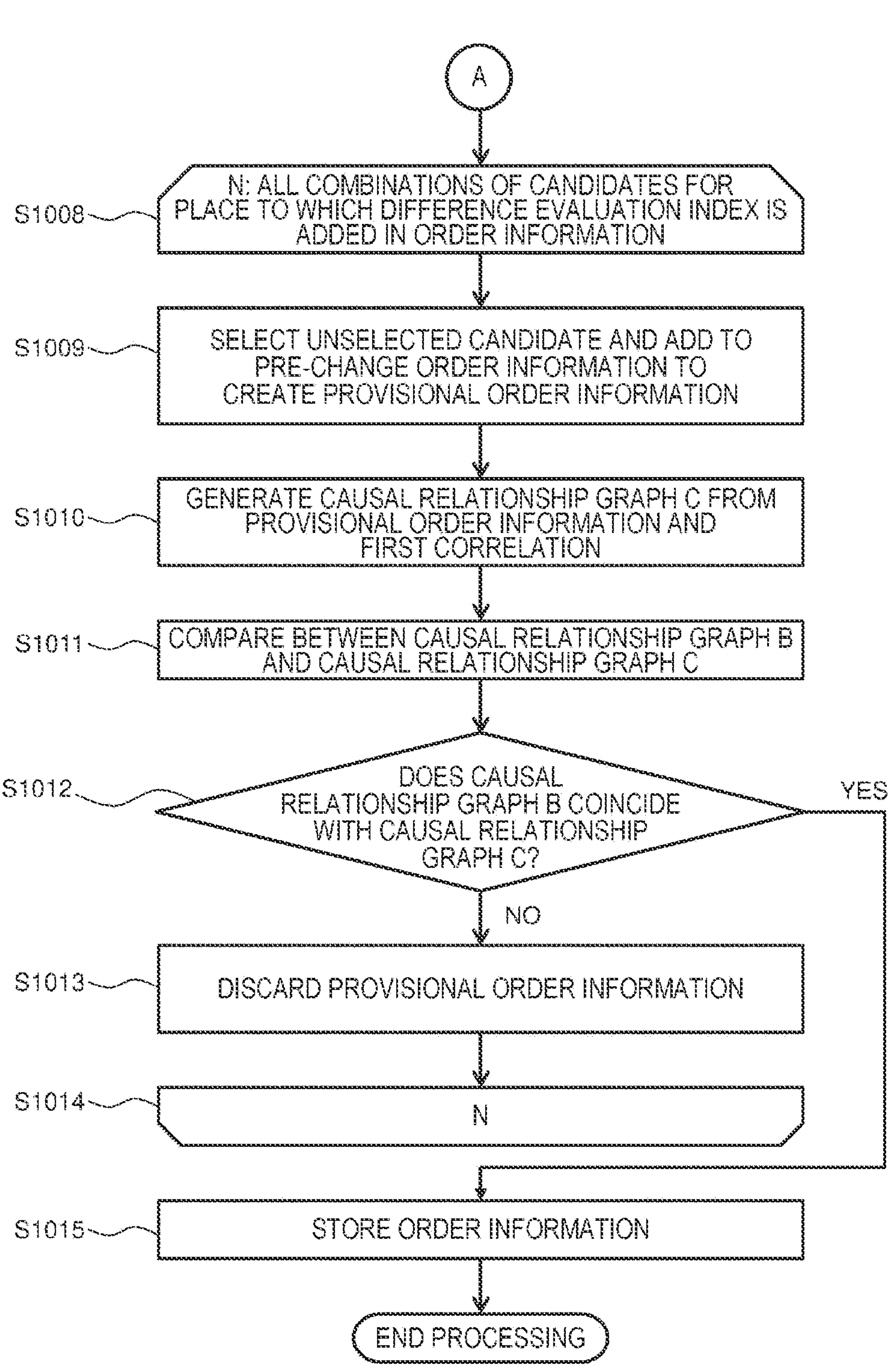
FIG. 13 is a flowchart illustrating the processing of the order calculation unit.

FIGS. 12 and 13 are flowcharts illustrating processing of the order calculation unit 109, and a summary of the processing described with reference to FIGS. 9 to 11. An execution subject of each step described below is the order calculation unit 109.

In step S1001, the order calculation unit 109 acquires the causal relationship graph A 900, which is the causal relationship graph 104 before editing. In subsequent step S1002, the order calculation unit 109 acquires the causal relationship graph B 901, which is the causal relationship graph 104 after editing. In subsequent step S103, the order calculation unit 109 acquires all the evaluation indexes in which a way of connecting lines is different from that of the causal relationship graph A 900, that is, all the difference evaluation indexes 903 in the causal relationship graph B 901.

In subsequent step S1004, the order calculation unit 109 obtains the number of evaluation indexes in the difference evaluation index 903 and stores the number in a variable d. In subsequent step S1005, the order calculation unit 109 acquires the pre-change order information 904, that is, the order information 106 at a current time. In subsequent step S1006, the order calculation unit 109 deletes the evaluation index existing in the difference evaluation index from the pre-change order information 904 and sets the result as the pre-addition order information 906. In subsequent step S1007, the order calculation unit 109 adds d columns to the right of each column having the evaluation index in the pre-change order information 904. Thereafter, the order calculation unit 109 proceeds to step S1008 in the next drawing via a circled A.

In FIG. 13, in step S1008, the order calculation unit 109 calculates all combinations of the candidates for the place to which the difference evaluation index 903 is added in the pre-change order information 904, and a set of the combinations is referred to as N. Hereinafter, the order calculation unit 109 selects the processing of steps S1009 to S1003 one by one from the set N and repeats the processing. In step S1009, the order calculation unit 109 selects one unselected set from the set N, adds an evaluation index to the pre-change order information 904, and temporarily stores the result as the provisional order information 908. In subsequent step S1010, the order calculation unit 109 generates the causal relationship graph C 910 from the provisional order information 908 and the first correlation 102.

In subsequent step S1011, the order calculation unit 109 compares the causal relationship graph B 901 with the causal relationship graph C 910. In subsequent step S1012, as a result of the comparison, in a case where it is determined that the causal relationship graph B 901 and the causal relationship graph C 910 coincide with each other, the order calculation unit 109 proceeds to step S1015, and in a case where it is determined that the causal relationship graph B and the causal relationship graph C do not coincide with each other, proceeds to step S1013.

In step S1013, the order calculation unit 109 discards the provisional order information 908, and in subsequent step S1014, the process returns to step S1019. In step S1015, the order calculation unit 109 stores the provisional order information 908 as the corrected order information 106, and ends the processing illustrated in FIGS. 12 and 13.

According to the first embodiment described above, the following operational effects can be obtained.

(1) An improvement system 10 includes: a first correlation calculation unit 101 which reads parameter information 100, which is information regarding a plurality of evaluation indexes in a business process, and calculates a first correlation 102 in which a correlation between the evaluation indexes is expressed by a correlation coefficient; a graph generation unit 103 which creates a causal relationship graph 104, in which the evaluation indexes are set as nodes and a correlation between the evaluation indexes is representing by a link, on the basis of the first correlation 102 and order information 106 which is information regarding priorities of the plurality of evaluation indexes; an interface unit 110 which presents the causal relationship graph 104 to a user 105 and receives a change to the causal relationship graph 104 by the user 105; and an order calculation unit 109 which updates the order information 106 on the basis of the change to the causal relationship graph 104 by the user 105, and enables the graph generation unit 103 to generate the causal relationship graph 104 after the change by the user 105. Therefore, editing of the causal relationship graph 104 by the user 105 can be reflected in the order information 106, and the user 105 can rewrite the order information 106 without performing a complicated operation.

(2) The improvement system 10 includes a second correlation calculation unit 107 which generates a second correlation 108 indicating, by words, a correlation between quantities of the evaluation indexes on the basis of the parameter information 100 and the order information 106. When the order information 106 is updated by the order calculation unit 109, the second correlation calculation unit 107 generates the second correlation 108 on the basis of the updated order information 106 and the parameter information 100. Therefore, the improvement system 10 can express the correlation between the evaluation indexes by words.

(3) As illustrated in FIG. 5, the graph generation unit 103 displays, on the causal relationship graph 104, the evaluation index of which the correlation coefficient is a predetermined threshold, for example, 0.70 or more. Therefore, only the evaluation index having a strong correlation can be presented to the user 105.

(4) The first correlation calculation unit 101 calculates the correlation coefficient by linear approximation. Therefore, the correlation coefficient can be calculated by a simple calculation.

(5) As illustrated in FIG. 9, the order calculation unit 109 extracts, as a difference evaluation index 903, the evaluation index related to the change to the causal relationship graph by the user 105, creates a plurality of pieces of provisional order information 908 in which an order of the difference evaluation index 903 is changed in the order information 106, and sets, as the updated order information 106, the provisional order information 908 in which a causal relationship graph C 910 created by the graph generation unit 103 on the basis of the provisional order information 908 and the parameter information 100 coincides with the causal relationship graph B 901 after the change by the user 105. Therefore, the order calculation unit 109 can calculate the order information 106 that matches the change of the user 105 without performing a complicated arithmetic operation.

(6) For the evaluation index of which the correlation coefficient is a predetermined threshold or more, the graph generation unit 103 creates, as the link, a directed edge having the evaluation index of a higher rank in the order information 106 as a start point and the evaluation index of a lower rank in the order information as an end point. Therefore, the correlation between the evaluation indexes can be visually presented to the user 105.

(7) The interface unit 110 receives an operation of the user 105 changing the link in the causal relationship graph 104. Therefore, the improvement system 10 can reflect the change of the link by the user 105 in the order information 106.

(8) On the basis of selection of the node by the user 105, the interface unit 110 presents the second correlation related to the selected node to the user. Therefore, the information regarding the evaluation index in which the user 105 is interested can be provided.

(9) The interface unit 110 multiplies the quantity in the second correlation by a predetermined magnification on the basis of an operation of the user 105 and displays the result. Therefore, the second correlation can be presented to the user 105 in an easy-to-understand manner.

(10) The second correlation calculation unit 107 calculates, as the second correlation, a regression coefficient between the evaluation indexes.

(11) The evaluation index includes at least one of man-hours or cost.

First Modification

In the above-described embodiment, the liquid crystal display and the pointing device are exemplified as the configuration of the interface unit 110, and the configuration in which the information is directly presented to the user 105 and the information is directly acquired from the user 105 has been described. However, the interface unit 110 may be configured to indirectly exchange information with the user 105, and for example, the interface unit 110 may be configured to input and output information to and from a device possessed by the user 105.

Second Embodiment

A second embodiment of the improvement system will be described with reference to FIGS. 14 to 16. In the following description, the same components as those of the first embodiment are denoted by the same reference signs, and differences will be mainly described. The points not particularly described are the same as those in the first embodiment. The present embodiment is different from the first embodiment mainly in that a layout change by a user is accepted.

In the present embodiment, a layout correction to the causal relationship graph 104 from the user 105 is received. The layout correction mentioned here is correction of an X coordinate and a Y coordinate of each node in the causal relationship graph 104, and the relationship of the directed edge between nodes is unchanged before and after the layout correction.

FIG. 14 is a functional configuration diagram of an improvement system 10A according to the second embodiment. In FIG. 14, as compared with FIG. 1, layout information 1100 is added, and input and storage are performed on the basis of an operation to the interface unit 110 by the user 105. That is, the interface unit 110 reads and reflects the existing layout information 1100 on the display, and when the user 105 edits the layout, the layout information after the change is stored as the layout information 1100. In addition, the interface unit 110 may automatically read the layout information 1100 when the improvement system 10A is activated.

Figure 15:
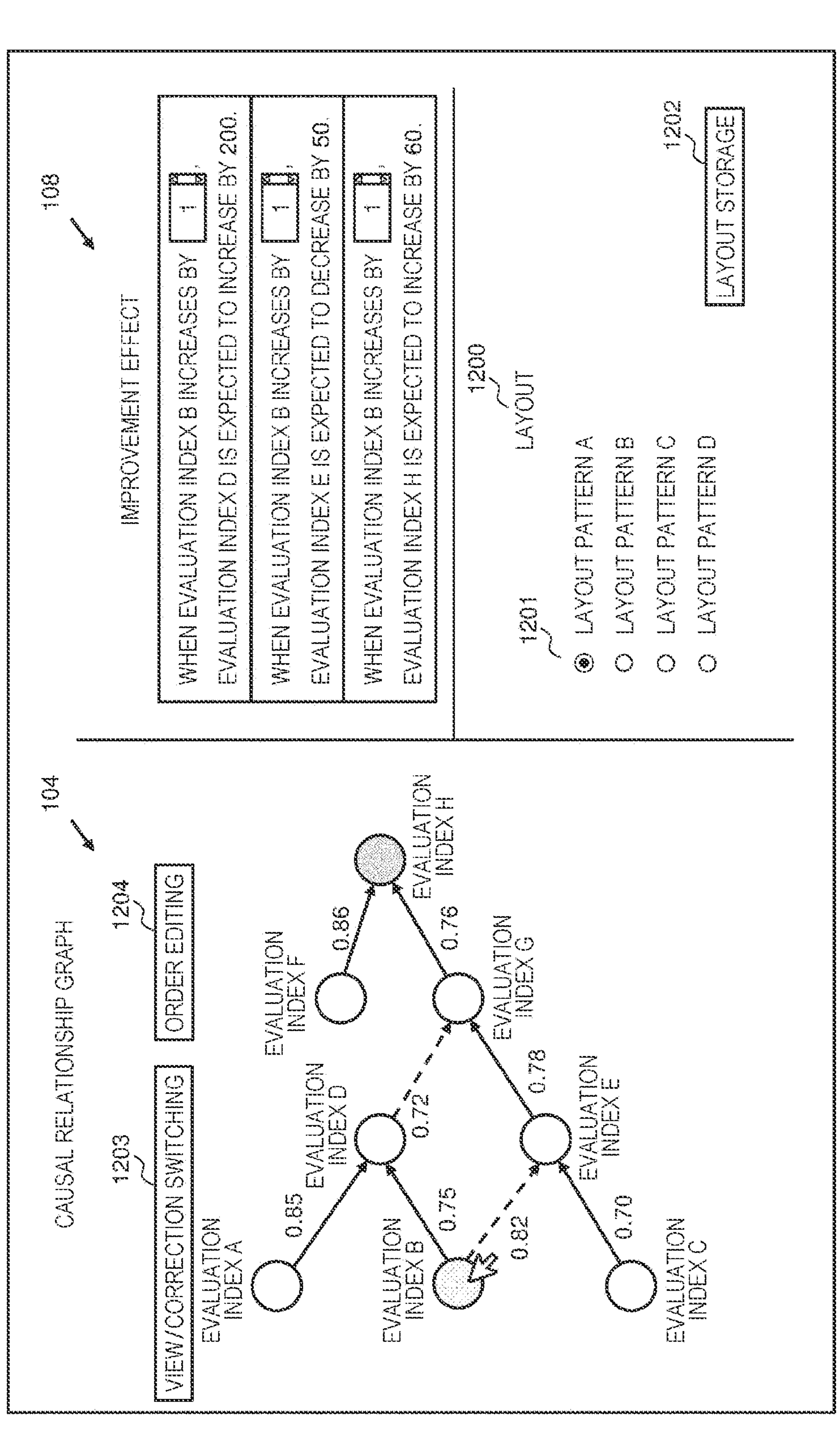
FIG. 15 is a diagram illustrating an example of display of the interface unit in the second embodiment.

FIG. 15 is a diagram illustrating a display on the interface unit 110 in the second embodiment. In FIG. 15, as compared with FIG. 4, a layout operation unit 1200 is added at the lower right in the drawing, and a "view/correction switching" button 1203 and an "order editing" button 1204 are added at the upper part in the drawing. The layout operation unit 1200 includes a layout pattern 1201 capable of switching a plurality of layouts and a layout storage button 1202 for storage processing.

When the user 105 selects one layout pattern from the layout pattern 1201 in the layout operation unit 1200, the interface unit 110 corrects the layout of the causal relationship graph 104 on the basis of the layout information 1100. When the user 105 presses the "view/correction switching" button 1203, each node of the causal relationship graph 104 can be dragged and dropped, thereby modifying the layout. In a case where it is desired to end the correction of the layout of the causal relationship graph 104 and edit the order relationship, the user 105 selects the "order editing" button 1204. In addition, when the user 105 presses the layout storage button 1202, the interface unit 110 stores the currently displayed layout in the layout information 1100.

Figure 16:
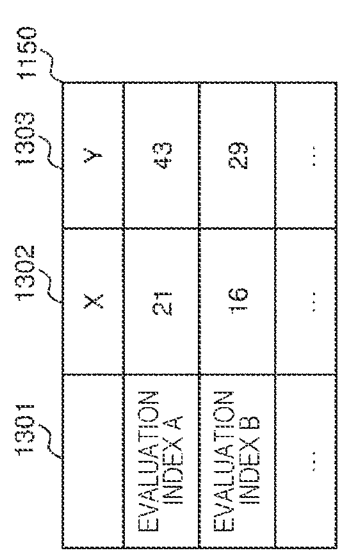
FIG. 16 is a diagram illustrating an example of layout information.

FIG. 16 is a diagram illustrating an example of the layout information 1150. The layout information 1150 has the name of an evaluation index in a column 1301, the information of an X coordinate in a column 1302, and the information of a Y coordinate in a column 1303. The layout information 1150 is rewritten by the interface unit 110 on the basis of the operation of the user 105.

According to the second embodiment described above, the position of each evaluation index of the causal relationship graph 104 can be freely changed so that the user 105 can easily see the causal relationship graph.

Third Embodiment

A third embodiment of the improvement system will be described with reference to FIG. 17. In the following description, the same components as those of the first embodiment are denoted by the same reference signs, and differences will be mainly described. The points not particularly described are the same as those in the first embodiment. The present embodiment is different from the first embodiment mainly in that detailed information regarding a node is displayed on the interface unit.

Figure 17:
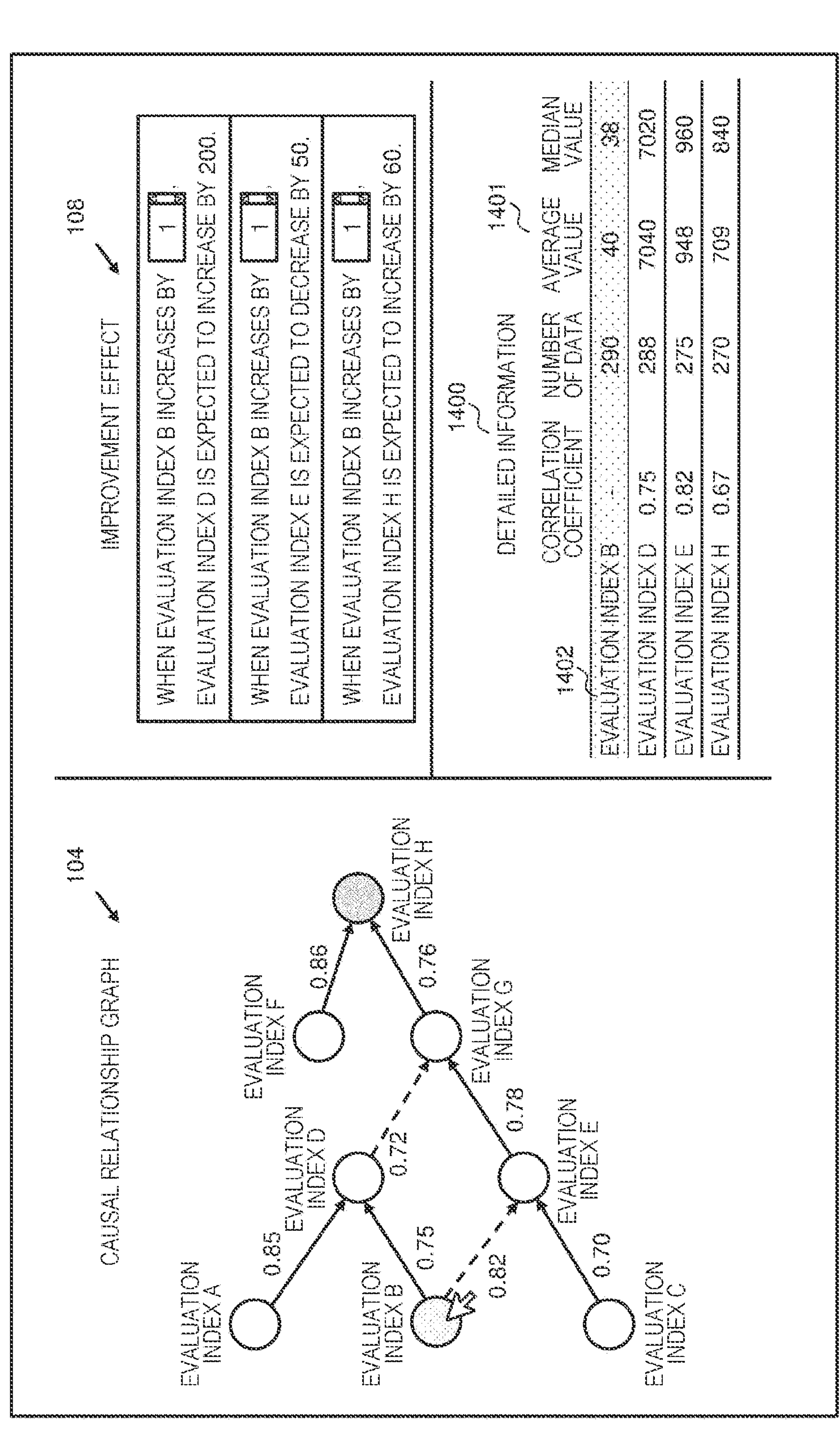
FIG. 17 is a diagram illustrating an example of display of the interface unit in a third embodiment.

FIG. 17 is a diagram illustrating an example of display on the interface unit 110 in the third embodiment. In FIG. 17, a detailed information display unit 1400 is added to FIG. 4. When the user 105 selects a node of interest in the causal relationship graph 104 displayed on the interface unit 110, the interface unit 110 performs the following operation. That is, the interface unit 110 displays the improvement effect 108 regarding the selected node in the upper right of the drawing, and further displays the detailed information of each evaluation index included in the improvement effect 108 in the detailed information display unit 1400 in the lower right of the drawing. The detailed information includes statistical data such as a correlation coefficient, the number of data, an average value, and a median value. The evaluation index of the node selected by the user 105 may be displayed in an aspect different from the others as indicated by reference sign 1402.

According to the third embodiment described above, the detailed information of the evaluation index of interest of the user 105 can be displayed on the interface unit 110.

Fourth Embodiment

A fourth embodiment of the improvement system will be described with reference to FIG. 18. In the following description, the same components as those of the first embodiment are denoted by the same reference signs, and differences will be mainly described. The points not particularly described are the same as those in the first embodiment. The present embodiment is different from the first embodiment mainly in that each node can be individually set to be hidden in the interface unit.

Figure 18:
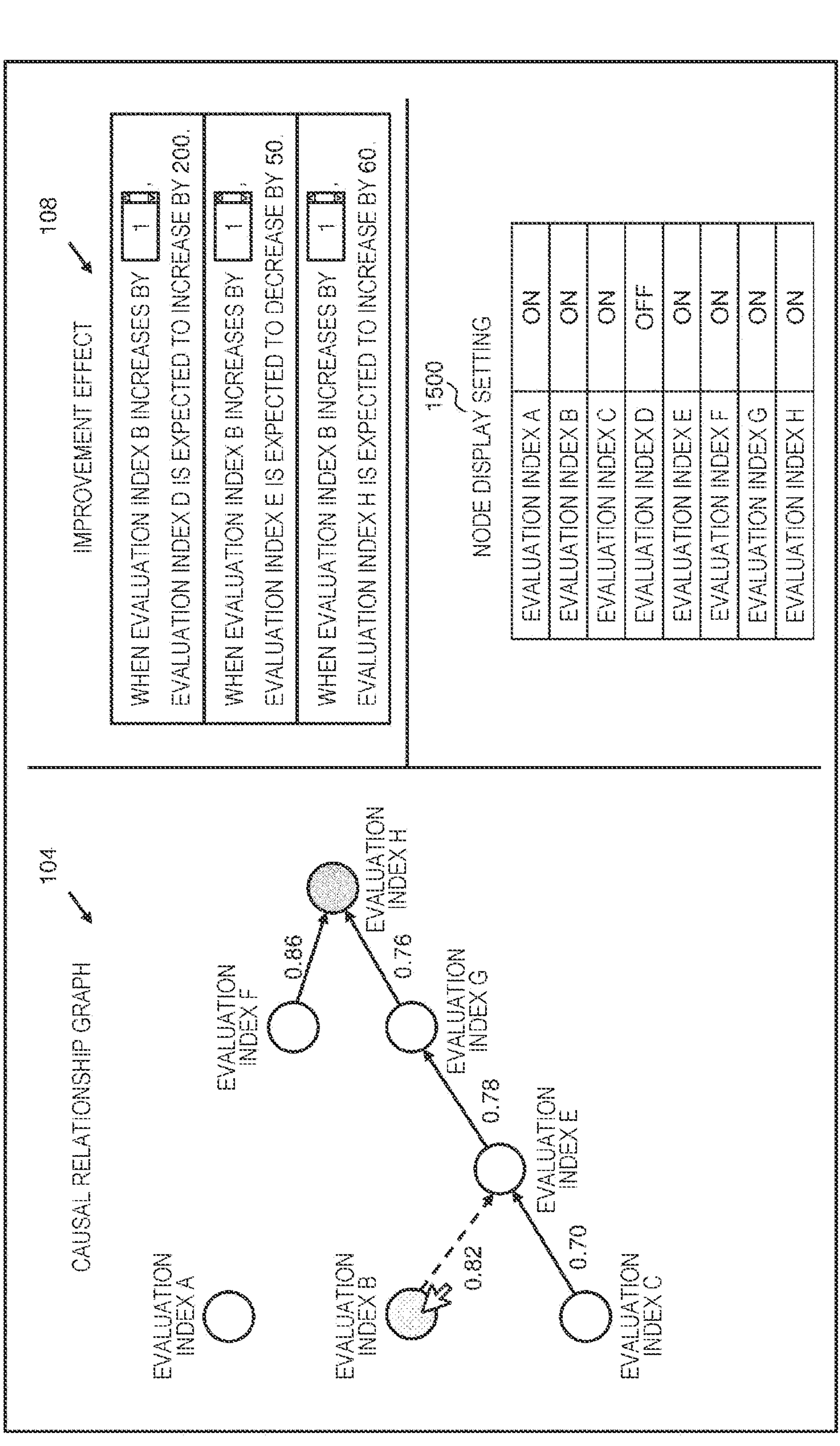
FIG. 18 is a diagram illustrating an example of display of the interface unit in a fourth embodiment.

FIG. 18 is a diagram illustrating an example of display on the interface unit 110 in the fourth embodiment. FIG. 18 is different from FIG. 4 in that a node display setting unit 1500 is added. In the node display setting unit 1500, "ON" or "OFF" is displayed for each evaluation index. "ON" indicates that the display is performed on the interface unit 110, and "OFF" indicates that the display is not performed on the interface unit 110.

For example, each time the user 105 selects each item in the node display setting unit 1500, "ON" and "OFF" are switched. When a certain evaluation index is set to "OFF", the interface unit 110 hides not only the evaluation index but also the directed edge connected to the evaluation index. When a certain evaluation index is set to "ON", the interface unit 110 displays not only the evaluation index but also the directed edge connected to the evaluation index.

According to the fourth embodiment described above, the following operational effects can be obtained.

(12) The interface unit 110 hides one or more of the evaluation indexes on the basis of an operation of the user 105. Therefore, it is possible to provide only information of a necessary evaluation index without displaying an evaluation index unnecessary for the user 105.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In each of the above-described embodiments and modifications, the program is stored in the ROM (not illustrated), but the program may be stored in a nonvolatile storage device included in the improvement system 10. In addition, the improvement system 10 may include an input/output interface (not illustrated), and if needed, a program may be read from another device via a medium which can be used by the input/output interface. Here, the medium refers to, for example, a storage medium detachable from the input/output interface, or a communication medium, that is, a wired, wireless, or optical network, or a carrier wave or a digital signal propagating through the network. In addition, some or all of the functions implemented by the program may be implemented by a hardware circuit or an FPGA.

The embodiments and modifications described above may be combined with each other. Although various embodiments and modifications have been described above, the present invention is not limited to these contents. Other embodiments considered within the scope of the technical idea of the present invention are also included within the scope of the present invention.

REFERENCE SIGNS LIST

10 improvement system
100 parameter information
101 first correlation calculation unit
102 first correlation
103 graph generation unit
104 causal relationship graph
105 user
106 order information
107 second correlation calculation unit
108 second correlation, improvement effect
109 order calculation unit
110 interface unit

The invention claimed is:

1. A system comprising:
a processor, configured to:
read parameter information corresponding to information regarding a plurality of evaluation indexes in an operational process;
calculate a first correlation in which a correlation between the evaluation indexes is expressed by a correlation coefficient;
create a causal relationship graph, in which the evaluation indexes are set as nodes and the correlation between the evaluation indexes is represented by a directed edge having a first evaluation index of a higher rank in an order information as a start point and a second evaluation index of a lower rank in order information as an end point, based on the first correlation and the order information corresponding to information regarding priorities of the evaluation indexes;
present, via a display device, the causal relationship graph to a user;
receive, via an input device, a change to a direction of directed edge in the causal relationship graph by the user;
update the order information based on the change to the direction of directed edge in the causal relationship graph by the user;
subsequent to updating the order information, perform a simple regression analysis using a third evaluation index of a lower rank in the updated order information as an explanatory variable, and a fourth evaluation index of a higher rank in the updated order information as an objective variable;
calculate a value based on a slope and a sign of a linear term of a regression expression of the simple regression analysis as an improvement effect;
update the causal relationship graph based on the updated order information and the improvement effect; and
display, via the display device, the updated causal relationship graph based on the updated order information and the improvement effect.

2. The system according to claim 1, wherein the processor is configured to:
display, via the display device on the causal relationship graph, at least one of the evaluation indexes of which the correlation coefficient is greater than or equal to a predetermined threshold.

3. The system according to claim 2, wherein the processor is configured to:
calculate the correlation coefficient by linear approximation.

4. The system according to claim 1, wherein the processor is configured to:
extract, as a difference evaluation index, at least one of the evaluation indexes index-related to the change to the causal relationship graph;
create a plurality of pieces of provisional order information in which an order of the difference evaluation index is changed in the order information; and
set, as the updated order information, the provisional order information in which a temporary causal relationship graph, that is created based on the provisional order information and the parameter information, coincide with the causal relationship graph after the change.

5. The system according to claim 1, wherein the the processor is configured to:
receive, via the input device, an operation of the user changing the direction of directed edge in the causal relationship graph.

6. The system according to claim 1, wherein based on selection of a node of the nodes by the user, the processor is configured to:
present the improvement effect related to the selected node to the user.

7. The system according to claim 1, wherein the the processor is configured to:
multiply a quantity in the improvement effect by a predetermined magnification a based on an operation of the user via the input device; and
display, via the display device, a result of multiplying the quantity by the predetermined magnification.

8. The system according to claim 1, wherein the evaluation index includes at least one of man-hours or cost.

9. The system according to claim 1, wherein the processor is configured to:

hide one or more of the evaluation indexes based on an operation of the user via the input device.

10. A method, comprising:

reading, by a processor, parameter information corresponding to information regarding a plurality of evaluation indexes in an operational process;

calculating, by the processor, a first correlation in which a correlation between the evaluation indexes is expressed by a correlation coefficient;

creating, by the processor, a causal relationship graph, in which the evaluation indexes are set as nodes and the correlation between the evaluation indexes is represented by a directed edge having a first evaluation index of a higher rank in an order information as a start point and a second evaluation index of a lower rank in order information as an end point, based on the first correlation and the order information corresponding to information regarding priorities of the evaluation indexes;

presenting, by the processor via a display device, the causal relationship graph to a user;

receiving, by the processor via an input device, a change to a direction of directed edge in the causal relationship graph by the user;

updating, by the processor, the order information based on the change to the direction of directed edge in the causal relationship graph by the user;

subsequent to updating the order information, performing, by the processor, a simple regression analysis using, a third evaluation index of a lower rank in the updated order information as an explanatory variable, and a fourth evaluation index of a higher rank in the updated order information as an objective variable;

calculating, by the processor, a value based on a slope and a sign of a linear term of a regression expression of the simple regression analysis as an improvement effect;

updating, by the processor, the causal relationship graph based on the updated order information and the improvement effect; and displaying, by the processor via the display device, the updated causal relationship graph based on the updated order information and the improvement effect.

* * * * *